United States Patent [19]
Johnson

[11] Patent Number: 5,661,379
[45] Date of Patent: Aug. 26, 1997

[54] ELECTRIC MOTOR

[75] Inventor: Ronald A. Johnson, Effingham, Ill.

[73] Assignee: Johnson Consulting, Inc., Effingham, Ill.

[21] Appl. No.: 524,261

[22] Filed: Sep. 6, 1995

[51] Int. Cl.⁶ .................................................. H02P 7/62
[52] U.S. Cl. ........................ 318/139; 318/293; 318/496; 318/503
[58] Field of Search ................................ 318/139, 293, 318/494–498, 503; 388/804, 811, 819

[56] References Cited

U.S. PATENT DOCUMENTS

| | | |
|---|---|---|
| 1,189,296 | 7/1916 | Scheibe . |
| 2,900,588 | 8/1959 | Ramer . |
| 3,781,616 | 12/1973 | Mokrytzki et al. . |
| 3,860,858 | 1/1975 | Nola . |
| 4,161,680 | 7/1979 | Akamatsu . |
| 4,322,665 | 3/1982 | Landgraf . |
| 5,134,332 | 7/1992 | Nakamura et al. ............... 310/208 |
| 5,182,508 | 1/1993 | Schauder ............................ 318/801 |
| 5,352,964 | 10/1994 | Nakamura et al. ............... 318/772 |

*Primary Examiner*—Bentsu Ro
*Attorney, Agent, or Firm*—Roger M. Fitz-Gerald

[57] ABSTRACT

A fractional-power electric motor is provided to generate varying amounts of output torque supplied to a driven member over a wide range of RPM speeds so as to reduce power consumption on a battery-powered source. The electric motor includes a rotor and a stator assembly. The stator assembly is disposed around the rotor and is inductively coupled to the rotor. The stator assembly further includes a plurality of poles, each having a main winding and at least one fractional-power winding. The main winding and associated at least one fractional-power winding on each of the stator poles are wound so that the magnetic fluxes generated therefrom are added. Power switching circuits are provided for independently energizing the main and fractional-power windings on each of the stator poles. A controller is used to control selectively the frequency and duty cycle energization of the power switching circuits to vary the rotational speed of the rotor and the amounts of torque supplied to the driven member.

15 Claims, 6 Drawing Sheets

Generated torque to RPM of a conventional AC induction motor.

FIG. 8

Mechanism torque load to mechanism speed (RPM) on motor during acceleration.

ELECTRIC MOTOR

BACKGROUND OF THE INVENTION

1. Field of the Invention

This invention relates generally to battery-powered electric drive systems. More particularly, it relates to an improved electric motor which includes a unique stator construction so as to provide variable torque control over a wide range of operating speeds and reduced power supply loading on a battery source, thereby increasing the efficiency of the electric motor.

2. Description of the Prior Art

As is generally known in the art, battery-powered electric drive systems in recent years have become useful in small vehicles such as golf carts, lift-trucks, lawn tractors, and the like. In the prior art battery-powered drive systems, typically a single large electric motor which includes a stator winding has been connected to a source of operating power and a speed control circuit for controlling the operating speed of the motor. The stator winding surrounds a rotor and is inductively coupled thereto so as to rotate a shaft to produce the motor output. In these prior art systems, the power consumption from the battery-powered source will be substantially proportional to the operating speed of the motor. Therefore, in order to produce and maintain a high operating speed of the motor, the electric drive system will require a large power consumption from the limited supply of the battery-powered source. As a result, there is a problem of substantial drainage of the battery charge and thus a very limited useful lifetime for the power source.

This problem is exacerbated for an electric drive system intended for use in an on-road vehicle or electric-powered automobile because it greatly decreases the driving range of the vehicle between battery replacements or rechargings. It is a major obstacle to the development and acceptance of electric-powered on-road vehicles such as passenger cars, trucks or vans, which are desirable to decrease atmospheric pollution and which must achieve acceptance to meet various legal requirements.

A prior art search directed to the subject matter of this application in the U.S. Patent and Trademark Office revealed the following U.S. Pat. Nos.: 009,438 2,026,642 3,422,292 157,299 2,190,223 3,538,364 224,642 2,262,323 4,341,971 233,823 2,471,151 4,352,051 246,010 2,508,172 4,583,014 740,171 2,514,933 5,051,640 869,185 2,564,320 5,063,319 869,186 2,777,104 5,113,100 1,445,933 2,894,157 5,166,568 1,530,449 3,179,825 5,250,861 1,655,286 3,263,147 28,705 1,856,147 3,333,330 T925,001 1,992,725 3,348,111

U.S. Pat. No. 2,564,320 to M. W. Brainard issued on Aug. 14, 1951, discloses a permanent magnet type electric generator in which the circuit to the winding magnetizing the member controlling the magnetic flux includes a variable control, so that the magnetic saturation of the control member may be independently varied.

U.S. Pat. No. 3,263,147 to M. J. Robinett issued on Jul. 26, 1966, discloses a dynamoelectric machine of the commutator type which employs interpoles and includes means for automatically adjusting the strength of the flux at the interpoles in accordance with changes in the load and speed of the machine.

U.S. Pat. No. 3,348,111 to V. H. Woehler issued on Oct. 17, 1967, shows a direct current motor which is energized by a constant potential of direct current. The electric motor has an armature and a plurality of field pole coils, each of which is in series with the armature and in parallel with one another, and has switch means for selectively connecting one or more of the coils directly in series with the armature.

U.S. Pat. No. 4,352,051 to J. H. Johnson issued on Sep. 28, 1982, illustrates a single phase motor which includes a stator assembly having a main winding, a start winding, and an auxiliary winding in which the start and auxiliary windings are connected in two alternative configurations during start and run conditions. In the start condition, the start and auxiliary windings are interconnected by a series connection which causes current to flow through the auxiliary winding in a reverse direction to the flow through the start winding, so that there exists a bucking magnetic relationship between the fields in the start and auxiliary windings. In the run condition, the start and auxiliary windings are interconnected by a second series electrical connection which causes the current to flow through the auxiliary winding in a direction opposite to the first direction, so as to cause the magnetic fields in the start and auxiliary windings to be in an aiding relationship thereby improving motor operating efficiency.

The other patents listed above but not specifically discussed are believed to be only of general interest and to show the state of the art in electric motors having multiple windings. However, none of the prior art uncovered in the search disclosed an improved electric motor having a unique stator design like that of the present invention which provides means for controlling the amount of torque generated over a wide range of operating speeds so as to significantly reduce power consumption but yet to still maintain mechanism speed and performance. This is achieved in the present invention by a unique stator design in which each of the stator poles includes a main winding and at least one fractional-power winding, by which is meant a winding which can provide additional power which is a fraction of the power provided by the associated main winding. A power switching circuit is provided for independently energizing the main and the fractional-power windings on each of the stator poles. A controller is used for selectively controlling the power switching circuit to vary the rotational speed of a rotor and the amounts of torque supplied to a driven member.

SUMMARY OF THE INVENTION

Accordingly, it is a general object of the present invention to provide an improved electric motor for controlling the amount of torque generated over a wide range of operating speeds so as to significantly reduce power consumption.

It is an object of the present invention to provide an electric motor which includes a unique stator construction so as to provide variable torque control over a wide range of operating speeds and reduced power supply loading on a battery source.

It is another object of the present invention to provide an improved electric motor which includes a unique stator winding and connection arrangement so as to produce torque control and increase motor operating efficiency.

It is still another object of the present invention to provide an improved electric motor which includes a plurality of stator poles each having a main winding and at least one fractional-power winding.

It is yet another object of the present invention to provide an improved method and apparatus for an electric motor for controlling the amount of torque generated over a wide range of speeds.

In accordance with a preferred embodiment of the present invention, a battery-powered electric motor is provided which generates varying amounts of output torque supplied to a driven member over a wide range of RPM speed so as to reduce power consumption on the battery-powered source. The electric motor includes a rotor having an axis of rotation and a stator assembly. The stator assembly is disposed around the rotor and is inductively coupled to the rotor. The stator assembly has a plurality of poles, each of the stator poles including a main winding and at least one fractional-power winding.

The main winding and the associated fractional-power winding or windings on each of the stator poles are wound to be in phase with each other so that the magnetic flux generated in the associated fractional-power winding will be added to the magnetic flux generated in the main winding to produce an increased magnetic field strength. A power switching circuit is provided which, as a further improvement, independently energizes the main and the fractional-power windings on each of the stator poles. A controller is used for selectively controlling the power switching circuit to vary the rotational speed of the rotor and the amounts of torque supplied to the driven member.

BRIEF DESCRIPTION OF THE DRAWINGS

These and other objects and advantages of the present invention will become more fully apparent from the following detailed description when read in conjunction with the accompanying drawings in which like reference numerals indicate corresponding parts throughout, wherein:

FIGS. 4(a)–4(d) is a timing diagram, illustrating the voltage waveforms applied to the gates of the transistors and generated at the output terminals of the winding in FIG. 3;

FIGS. 5(a)–5(h) are timing diagrams, illustrating the waveforms generated at the output terminals of the windings in FIG. 2, with the duty cycle of the square waves being controlled to develop a full speed of operation;

FIGS. 6(a)–6(h) are timing diagrams similar to FIGS. 5(a)–5(h), with the duty cycle of the square waves being controlled to develop a reduced torque at most speeds of operation;

DESCRIPTION OF THE PREFERRED EMBODIMENT

Figure 1:
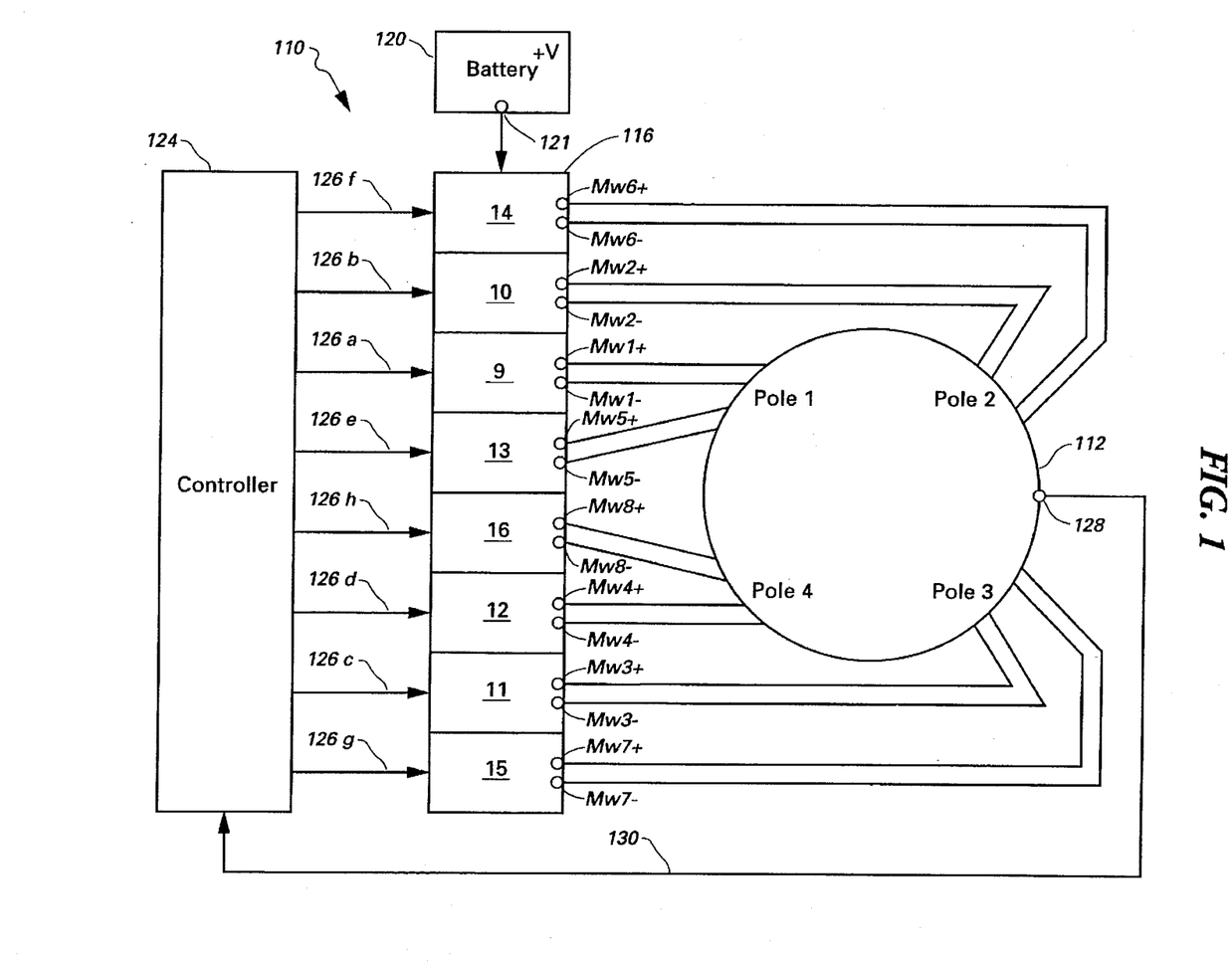
FIG. 1 is a simplified block diagram of an apparatus for controlling torque for an electric motor, constructed in accordance with the principles of the present invention.
Figure 2:
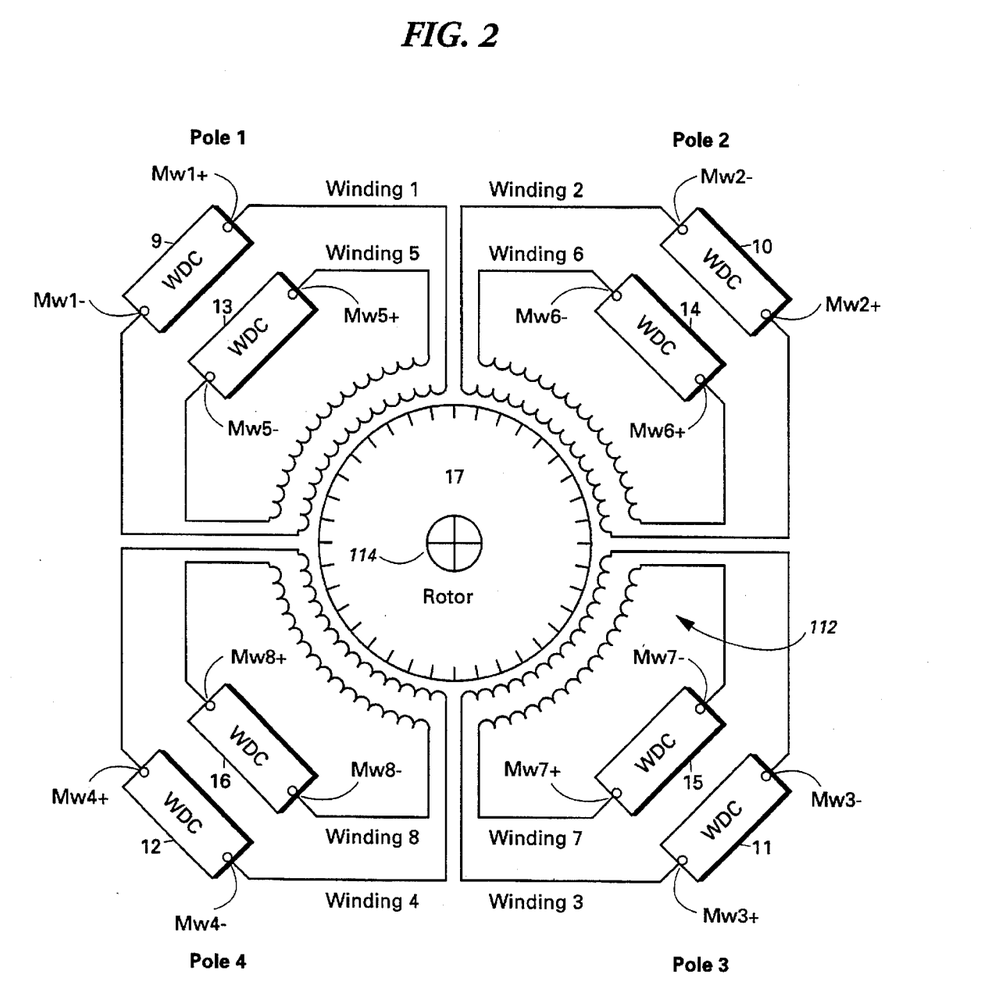
FIG. 2 is a circuit diagram of an electric motor of the present invention for use in FIG. 1.

Referring now in detail to the drawings, there is shown in FIG. 1 a simplified block diagram of an apparatus 110 for an electric motor 112 for controlling the amount of torque generated over a wide range of speeds which is constructed in accordance with the principles of the present invention. In FIG. 2, there is shown a simplified circuit diagram of the electric motor 112 of FIG. 1 which includes a rotor 17 mounted on a shaft 114 and a stator assembly having four poles —Pole 1, Pole 2, Pole 3 and Pole 4. The four poles are preferably spaced from one another around shaft 114 by 90 mechanical degrees, and each pole includes a main winding (1–4) and at least one fractional-power winding (5–8). This is exemplary because the invention is applicable to a motor having two, three or more than four poles.

In the electric motor 112 of FIG. 2, used to explain the invention, the first Pole 1 includes a main winding 1 and a fractional-power winding 5, and the second Pole 2 includes a main winding 2 and a fractional-power winding 6. The third Pole 3 includes a main winding 3 and a fractional-power winding 7, and the fourth Pole 4 includes a main winding 4 and a fractional-power winding 8. As disclosed herein, all of the eight windings are energized independently of one another.

The apparatus 110 of FIG. 1 as shown includes power switching circuits 116 formed of a plurality of independent winding drive control circuits 9–16. The winding drive control circuit 9 has its power output terminals Mw1+ and Mw1– connected across the main winding 1, and the winding drive control circuit 13 has its power output terminals Mw5+ and Mw5– connected across the fractional-power winding 5 associated with the first Pole 1. The winding drive control circuit 10 has its power output terminals Mw2+ and Mw2– connected across the main winding a, and the winding drive control circuit 14 has its power output terminals Mw6+ and Mw6– connected across the fractional-power winding 6 associated with the second Pole 2. Similarly, the winding drive control circuit 11 has its power output terminals Mw3+ and Mw3– connected across the main winding 3, and the winding drive control circuit 15 has its power output terminals Mw7+ and Mw7– connected across the fractional-power winding 7 associated with the third Pole 3. The winding drive control circuit 12 has its power output terminals Mw4+ and Mw4– connected across the main winding 4, and the winding drive control circuit 16 has its power output terminals Mw8+ and Mw8– connected across the fractional-power winding 8 associated with the fourth Pole 4.

On each of the stator poles, Pole 1 through Pole 4, the main and fractional-power windings are positioned and wound in the same sense or direction relative to each other so that the magnetic flux created in the fractional-power winding will be added to the magnetic flux created in the main winding for increased magnetic field strength. Further, in this example, the number of turns on the fractional-power windings in each pole are made to be smaller than the number of turns on the respective main windings so that its magnetic field strength is approximately ⅒th of the main windings. It is believed that a ratio of field strengths between 1 to 8 and 1 to 20 will be useful, depending upon the application.

Each of the winding drive control circuits ("WDC") 9–16 has its first input terminal 118 (see FIG. 3) connected to the positive output terminal 121 of a battery (+V) 120 and its second input terminal 122 connected to a ground potential so as to receive electric power from the battery. A microprocessor-based controller 124 includes a central processing unit and a memory such as a ROM in order to generate drive signals on lines 126a–126h for the respective winding drive control circuits 9 through 16. A rotational speed sensor 128 is provided to detect the rotational speed of the electric motor which is fed back to the controller 124 via line 130. Using this information, the controller 124 further controls the rotational speed of the rotor 17 and the amount of torque supplied by the rotor to a driven member by selectively changing the signal frequency and turning on and off the drive signals applied to the respective winding drive control circuits 9–16 in accordance with programmed instructions contained within the read-only-memory ROM. In particular, the program within the ROM provides for the selection of the ON and OFF states of the power switches in the winding drive control circuits 9–16 and the time duration of the states. The frequency of the signal controls the speed of the motor whereas the duty cycle of the drive control circuits determines the torque. The reference above to a ROM only refers to the present state of the controller art and other devices, either older or not yet invented which perform similar functions could also be used.

Figure 3:
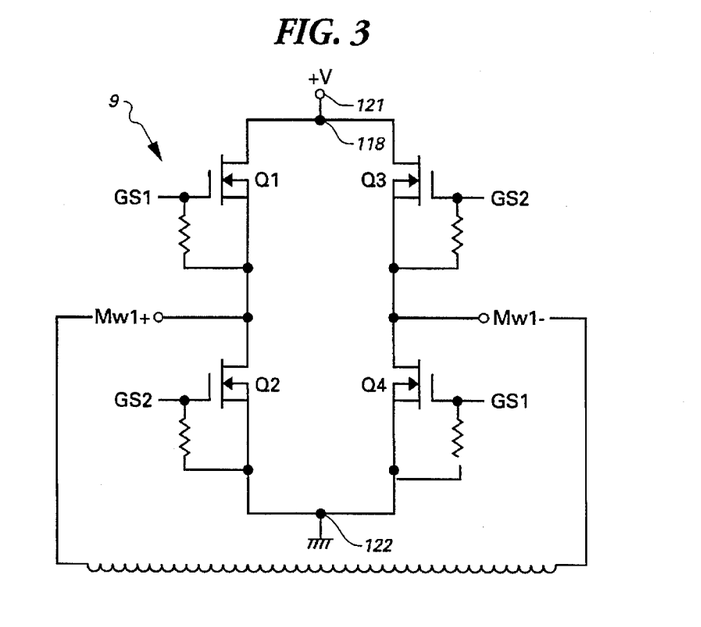
FIG. 3 is a schematic circuit diagram of a winding drive control circuit for one of the windings of FIG. 2.

Since each of the winding drive control circuits 9–16 are identical in their construction and operation, it will be sufficient to describe in detail only one of the winding drive control circuits, which as shown is circuit 9. In FIG. 3, there is shown a schematic circuit diagram of the winding drive control circuit 9 which is formed of an array of gate-controlled power MOS field-effect transistors Q1, Q2, Q3 and Q4 connected in an H-bridge network. The input terminals 118 and 122 of the control circuit 9 are connected across the battery source (+V) of power. The drive signals on the line 126a from the microprocessor-based controller 124 are applied to the gates of the respective transistors Q1–Q4 via gate terminals GS1 and GS2 so as to cause them to turn ON and OFF in accordance with the programmed instructions. As a result, a pulse width modulation of the battery voltage is accomplished to produce an AC output voltage waveform to drive the main winding 1.

Figure 4:
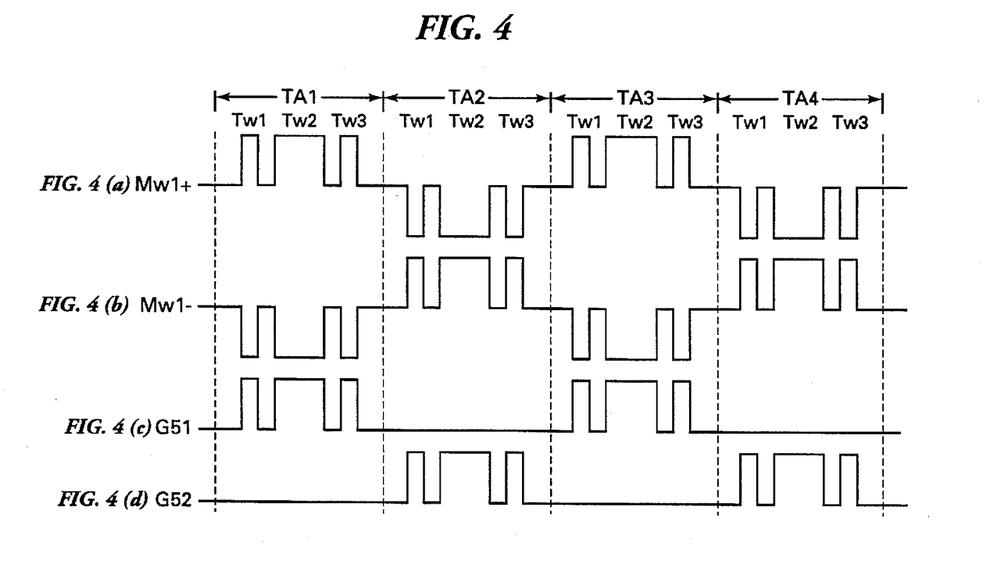

The operation of the winding drive control circuit of FIG. 3 will now be explained in detail with reference to the timing diagrams in FIGS. 4(a)–4(d). In FIG. 4(c), the positive pulses during the time duration TA1 applied to the gate terminals GS1 will cause the paired transistors Q1 and Q4 to be turned on simultaneously so that a positive current flow is conducted through the transistor Q1 to the output terminal Mw1+, through the main winding 1 to the output terminal Mw1−, and through the transistor Q4, thereby producing a positive magnetic field in the first Pole 1. Then, the transistors Q1 and Q4 are turned off and the transistors Q2 and Q3 are turned on simultaneously by the positive pulses during the time duration TA2 applied to the gate terminals GS2, as illustrated in FIG. 4(d). As a result, a negative current flow is conducted through the transistor Q2 to the output terminal Mw1+, through the main winding 1 to the output terminal Mw1− and through the transistor Q3, thereby developing a negative magnetic field in the first Pole 1.

Figure 5:
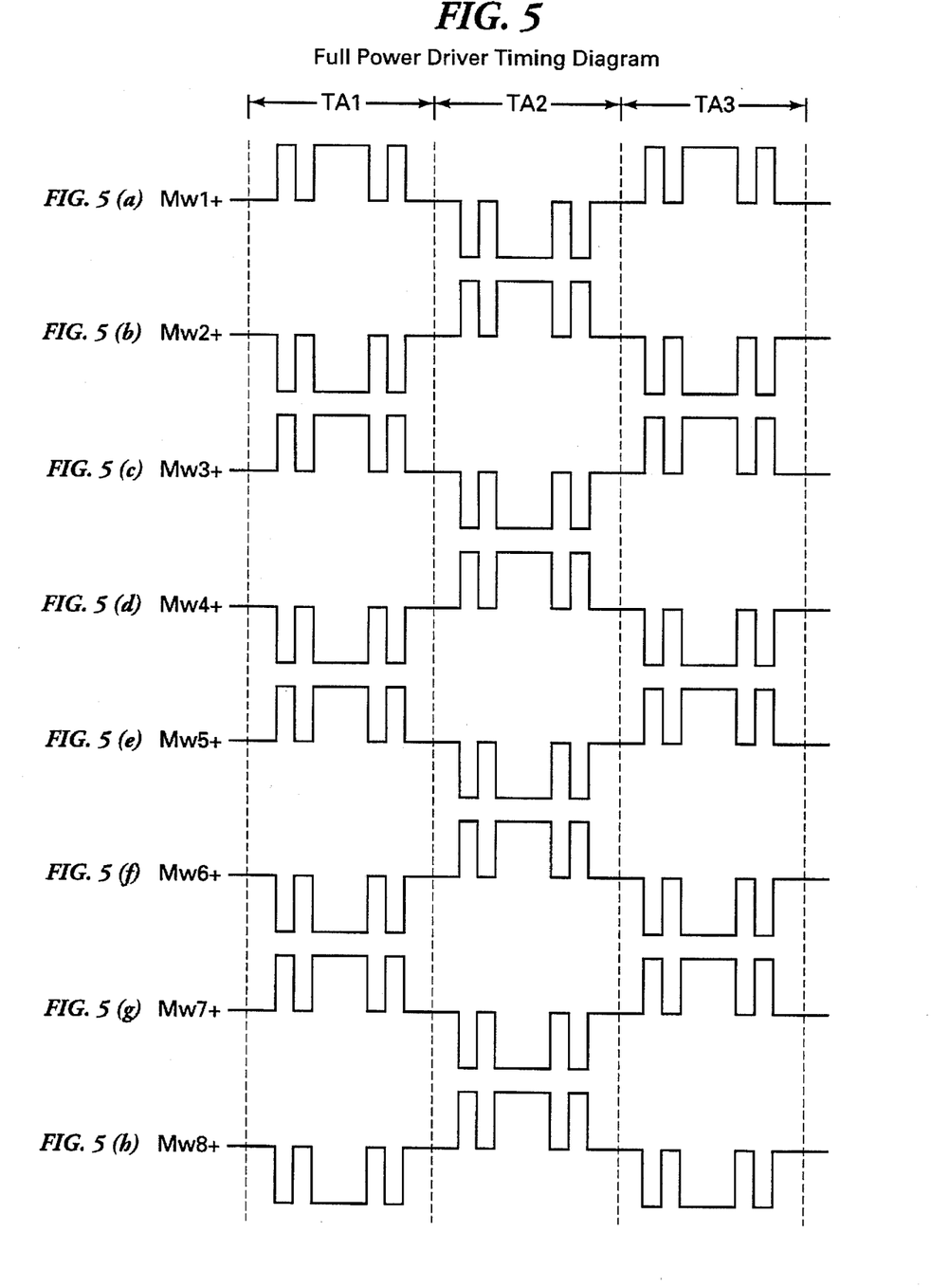
Figure 6:
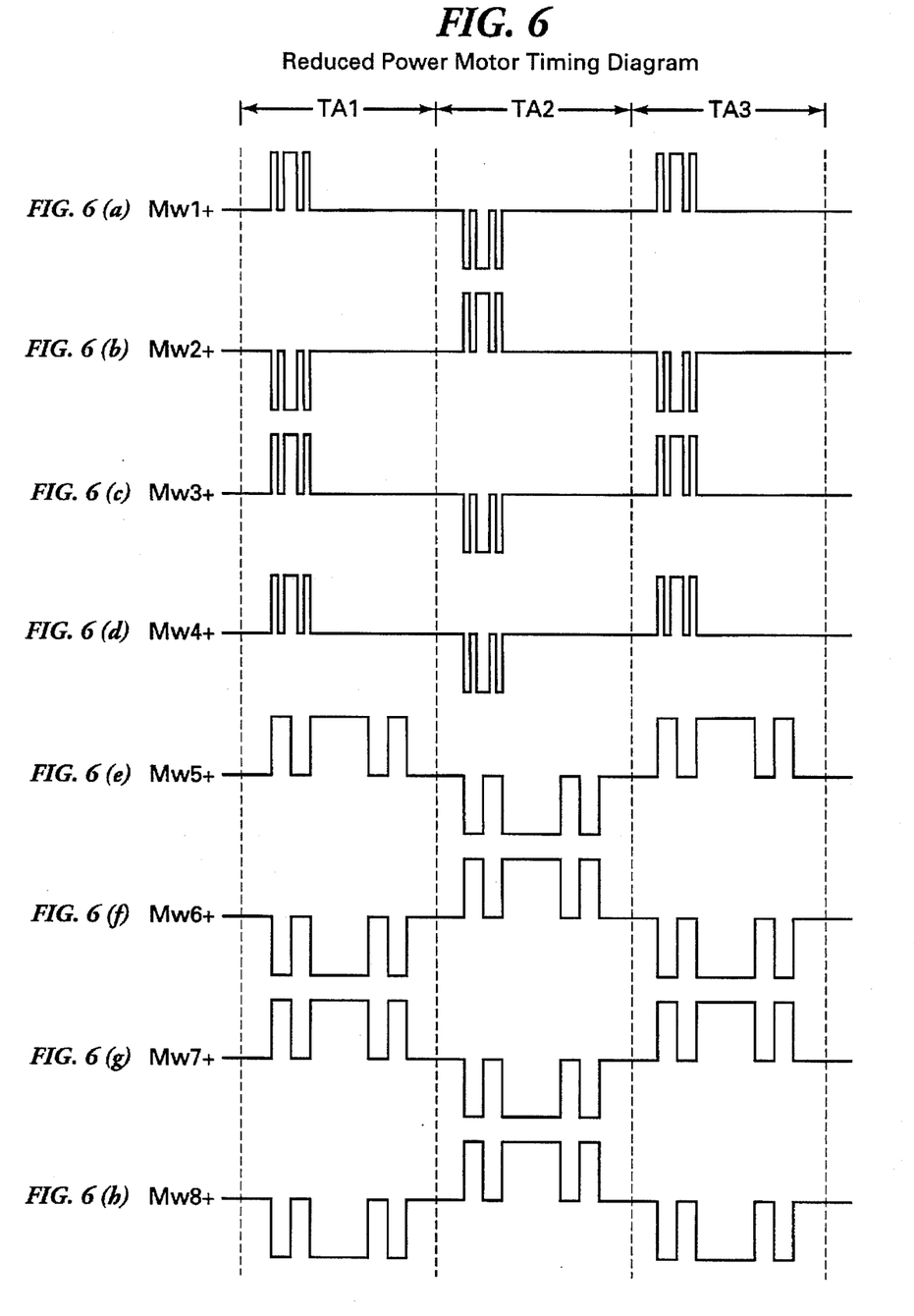

The resultant voltage waveforms at the respective output terminals Mw1+ and Mw1− are illustrated in FIGS. 5(a) and 5(b). The pulse widths Tw1, Tw2 and Tw3 of the successive positive pulses in the one-half cycle TA1 and the successive negative pulses in the one-half cycle TA2 are varied approximately to the voltage potential of a sinusoidal A.C. waveform and will vary depending upon the duty cycle needed for the power level of the particular winding to produce the desired torque.

In FIGS. 5(a)–5(h), there are shown timing diagrams of the voltage waveforms generated at the positive output terminals Mw1+ through Mw8+ of the respective winding drive control circuits 9–16 of FIG. 2 so as to develop full power rotation of the rotor 17. As can be seen from FIGS. 5(a) and 5(e), the main winding 1 and the fractional-power winding 5 of the first Pole 1 are both driven in the time duration TA1 to produce a positive current flow and thus a positive magnetic field. Similarly, the main winding 3 and the fractional-power winding 7 of the third Pole 3 are both driven in the time duration TA1 to produce a positive current flow and thus a positive magnetic field, as depicted in FIGS. 5(c) and 5(g).

On the other hand, the main winding 2 and the fractional-power winding 6 of the second Pole 2 are both driven in the same time duration TA1 to produce a negative current flow and thus a negative magnetic field. This is illustrated in FIGS. 5(b) and 5(f). Similarly, the main winding 4 and the fractional-power winding 8 in the fourth Pole 4 are both driven to produce a negative current flow and thus a negative magnetic field during the time duration TA1. This is depicted in FIGS. 5(d) and 5(h). It should be noted that the main windings 1–4 and the associated fractional-power windings 5–8 in each pole are in phase so that their magnetic field (either positive or negative depending on the time duration) will be added together so as to generate an increased magnetic field strength.

As a result, during the time duration TA1 the positive magnetic field in the Pole 1 will be attracted to the induced negative magnetic field in the Pole 2 but will be repelled against the induced positive magnetic field in the Pole 4. Similarly, the negative magnetic field in the Pole 2 will be attracted to the induced positive field in the Pole 3 but will be repelled against the induced negative magnetic field in the Pole 1. This applies likewise to the third and fourth poles, Pole 3 and Pole 4. Therefore, as illustrated, the rotor 17 will be caused to rotate ¼th of a turn in a clockwise direction during the time duration TA1. The direction of rotation of course could be reversed by means well known in the art.

During the time duration TA2, it will be noted that all of the main and fractional windings 9–16 are energized or driven to develop a magnetic field opposite in polarity to the one developed during the time duration TA1. Consequently, the magnetic field generated in the respective main and fractional-power windings will again be attracted and repelled against the induced fields in adjacent pole regions so as to cause the rotor to rotate another ¼th of a turn.

This process in the time duration TA3 is reversed again from the time duration TAa and is the same as in the time duration TA1. Therefore, the rotor is rotated another ¼th of a turn. This process is repeated over and over again in order to cause the rotor to continuously turn at an RPM output or speed determined by the mathematical expression in Equation (1):

$$RPM\ speed = \frac{1}{(Fr/MP)} \times 60 \qquad (1)$$

where
Fr=frequency determined by sum of time durations TA1 and TA2
MP=number of motor poles divided by two.

Figure 7:
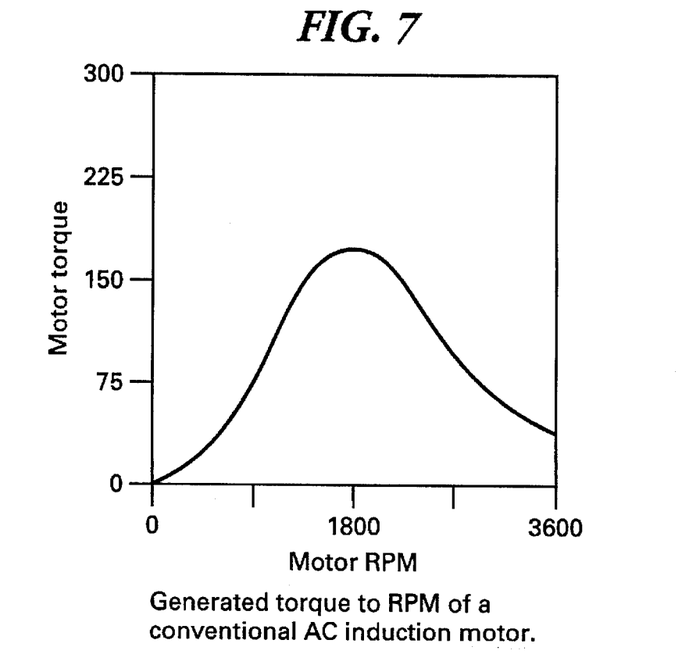
FIG. 7 is a graph of motor torque versus motor speed for a conventional AC induction motor.

In FIG. 7, there is shown a graph of generated motor torque against motor RPM of a conventional AC induction motor. Thus, it is noted that the generated motor torque is directly proportional to the motor RPM. However, as a driven mechanism obtains a constant speed the inertia due to the mass of the driven mechanism and the gearing ratio of the associated transmission will tend to reduce the torque load on the driving motor.

Figure 8:
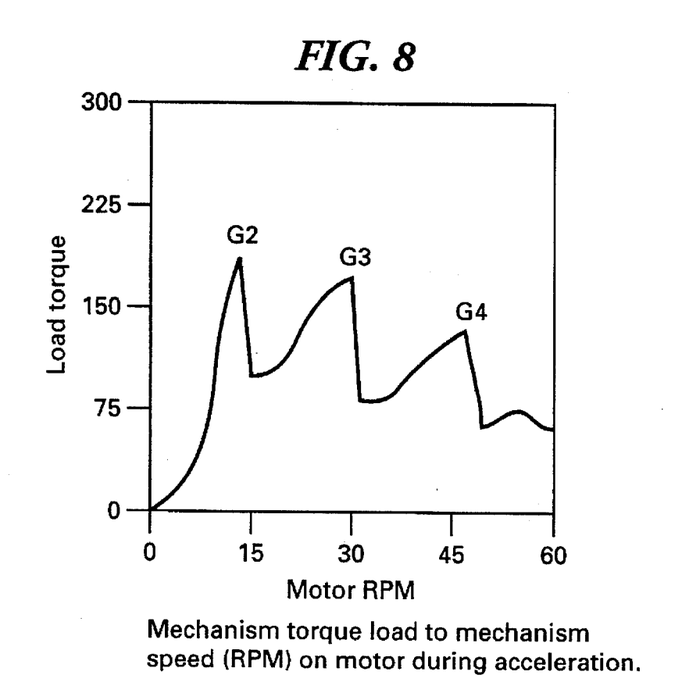
FIG. 8 is a graph of load torque versus mechanism speed for the electric motor of FIG. 2.

In FIG. 8 there is shown an exemplary graph of the torque load on the electric motor of the present invention in FIG. 2 against the drive mechanism speed during acceleration from zero to 60 mph. By using a 4-speed overdrive automatic transmission in the driving mechanism, it can be seen that the maximum torque loads are obtained during acceleration such as when the transmission shifts from first gear to second gear at the point 82, from second gear to third gear at the point G3, and from third gear to fourth gear at the point G4. However, it is noted that as the drive mechanism reaches a constant operating speed, the torque load is substantially reduced by more than 80%.

In view of this, the inventor has developed the unique stator design for the electric motor of the present invention wherein each stator pole is formed with a main winding and at least one fractional-power winding, both of which may be independently controlled. The system's microprocessor-based controller is used to selectively energize the winding drive control circuits for the main and fractional-power windings in order to generate the required RPM to drive the mechanism and to provide a minimum torque loading. By reducing the number of windings energized, the amount of torque load can be reduced and thus the power consumption on the battery power source can be proportionally reduced but yet still maintain mechanism speed and performance. The controller can also energize the windings with a reduced duty cycle so as to reduce the generated torque and power consumption.

In a typical operating condition, all of the main and fractional-power windings are energized initially with a duty cycle for full power so that the torque generated will be sufficient to accelerate the driven mechanism. Then, certain ones of the main and/or fractional-power windings are selectively de-energized so as to reduce the output torque to a desired level. Alternatively, certain ones of the main and/or fractional-power windings are selectively energized with a gradually decreasing duty cycle so as to reduce the output torque. It should be apparent to those skilled in the art that the selection of the windings and the duty cycles can be varied in numerous combined ways so as to achieve the desired output torque and reduced power consumption. Further, in order to reduce the number of circuit components the common windings (i.e., main windings 1 and 3) could be connected in parallel and then driven by a single winding drive control circuit.

For instance, in FIG. 6(a)–6(h), there are shown timing diagrams of the voltage waveforms generated at the positive output terminals Mw1+ through Mw8+ of the windings 9–16 so as to develop a reduced output torque on the rotor. As can be seen in FIGS. 6(e) through 6(h), the fractional-power windings 5–8 are energized with full power or 100% duty cycle which is identical to the waveform in FIGS. 5(e)–5(h). Thus, the fractional-power windings 5–8 will provide 1/10th of the power as provided by the main windings 1–4. On the other hand, the main windings 1–4 are energized with reduced power or 25% duty cycle as depicted in FIGS. 5(a) through 5(d). Accordingly, if the size of the electric motor is assumed to be 20 HP, then the amount of the horsepower Thp developed by the motor can be calculated by Equation (2):

$$Thp = (Mdc \times Mhp) + (Fdc \times Fhp) \quad (2)$$

where
Mdc=percentage of duty cycle of main winding
Mhp=maximum horsepower of main winding
Fdc=percentage of duty cycle of fractional-power winding
Fhp=maximum horsepower of fractional-power winding Therefore, the total horsepower generated by the electric motor when operated in accordance with the voltage waveforms of FIGS. 5(a)–5(h) will be given by the following:

$$\begin{aligned} Thp &= (.25 \times 18) + (1.00 \times 2) \\ &= (4.5) + (2) = 6.5\, HP \end{aligned}$$

It will be noted that the generated torque and the power consumption at this level is only 35% of the full power level at the driven RPM speed. Consequently, the electric motor of the present invention can reduce drastically the amount of power consumption on the battery-powered source while maintaining the mechanism RPM speed.

In another variation of the invention, two stators may be mounted and spaced axially from one another on the same shaft. One stator could comprise main windings as disclosed above while the second stator would comprise fractional-power windings as disclosed above. Both sets of windings could be similarly controlled as disclosed above and could react inductively with a single rotor piece or with mechanically axially spaced portions of a single rotor.

From the foregoing detailed description, it can thus be seen that the present invention provides an improved fractional-power electric motor which includes a unique stator construction so as to provide variable torque control over a wide range of operating speeds and reduced power supply loading on a battery source. The electric motor of the present invention includes a stator assembly formed of a plurality of poles. Each of the stator poles includes a main winding and at least one fractional-power winding which are adapted to be independently controlled.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A battery-powered electric motor for generating varying amounts of output torque supplied to a driven member over a wide range of RPM speeds so as to reduce power consumption on the battery-powered source comprising:

a rotor having an axis of rotation;

a stator assembly disposed around said rotor and being inductively coupled to said rotor;

said stator assembly having a plurality of poles;

each of said stator poles having a main winding and at least one fractional-power winding;

said main winding and said associated at least one fractional-power winding on each of said stator poles being wound so that the magnetic flux generated in said associated fractional-power winding will be added to the magnetic flux generated by said main winding to produce an increased magnetic field strength;

power switching means for energizing said main and said fractional-power windings on each of said stator poles;

said power switching means being formed of a plurality of winding drive control circuits each one being associated with one of said main windings and said fractional-power windings for independently energizing said main windings and said fractional-power windings;

said plurality of winding drive control circuits including an input terminal connected to the battery source and output terminals for producing A.C. voltage pulses across said windings;

controller means for controlling selectively said power switching means to vary the rotational speed of said rotor and the amounts of torque supplied to the driven member, and said controller means being coupled to each of said plurality of winding drive control circuits for varying the duty cycle of A.C. voltage pulses defining a pulse width modulated waveform; and each of said plurality of winding drive control circuits being formed of a plurality of transistors connected in a H-bridge network across said battery source, said plurality of transistors being turned on and off for producing said A.C. voltage pulses with alternating polarity and predetermined width.

2. An electric motor as claimed in claim 1, further comprising a plurality of fractional-power windings disposed on each of said stator poles.

3. An electric motor as claimed in claim 1, wherein said main winding and said at least one fractional-power winding on each of said stator poles are initially energized so as to increase the RPM speed and output torque of said rotor to a full power level and wherein one or more of said main and fractional-power windings are thereafter de-energized so as to reduce the output torque to the desired level.

4. An electric motor as claimed in claim 1, wherein one or more of selected main and fractional-power windings are gradually de-energized by decreasing the pulse width to reduce the duty cycle thereof so as to reduce the output torque to a desired level.

5. An electric motor as claimed in claim 1, further comprising sensing means for detecting the rotational speed of the driven member to produce a feedback signal to said controller means.

6. An electric motor as claimed in claim 1, wherein said plurality of stator poles comprises four poles which are displaced from one another by 90 mechanical degrees about said axis of rotation of said rotor.

7. An electric motor as claimed in claim 1, wherein said main windings and said fractional-power windings are displaced from one another along said axis of rotation of said rotor.

8. An electric motor as claimed in claim 1, wherein said fractional-power windings have a magnetic field strength between $\frac{1}{8}$th and $\frac{1}{20}$th of the strength of said main windings.

9. An electric motor as claimed in claim 1, wherein said fractional-power windings have a magnetic field strength equal to approximately $\frac{1}{10}$th of the strength of said main windings.

10. A method for controlling varying amounts of output torque supplied to a driven member over a wide range of RPM speeds by a battery-powered electric motor so as to reduce power consumption on the battery-power source comprising the steps of:

providing a plurality of stator poles around a rotor;

connecting a main winding and at least one fractional-power winding on each of said stator poles;

winding the main winding and the associated at least one fractional-power winding on each of the stator poles so that the magnetic fluxes generated therefrom will be added;

switching independently the main and the fractional-power windings on each of the stator poles through a plurality of winding drive control circuits each one being associated with one of the main windings and the fractional-power windings;

connecting an input terminal of the plurality of winding drive control circuits to the battery source and generating A.C. voltage pulses across the windings through its output terminals;

controlling selectively the energization of the main and the fractional-power windings to vary the rotational speed of the rotor and the amounts of torque supplied to the driven member;

varying the duty cycle of the A.C. voltage pulses so as to define a pulse-width modulated waveform;

the plurality of winding drive control circuits being formed of a plurality of transistors connected in a H-bridge network across the battery source; and turning on and off a predetermined pair of the transistors to generate the A.C. voltage pulses with alternating polarity and predetermined width.

11. A method as claimed in claim 10, further comprising the step of disposing a plurality of fractional-power windings on each of the stator poles.

12. A method as claimed in claim 10, further comprising the step of initially energizing the main winding and the at least one fractional-power winding on each of the stator poles so as to increase the RPM speed and output torque of the rotor to a full power level and thereafter de-energizing one or more of selected main and fractional-power windings so as to reduce the output torque to a desired level.

13. A method as claimed in claim 10, further comprising the step of gradually de-energizing one or more of selected main and fractional-power windings by decreasing the duty cycle of AC voltage pulses.

14. A method as claimed in claim 10, further comprising the step of sensing the rotational speed of the driven member and the output torque generated to produce a feedback signal.

15. A battery-powered electric motor for generating varying amounts of output torque supplied to a driven member over a wide range of RPM speeds so as to reduce power consumption on the battery-powered source comprising:

a rotor having an axis of rotation;

a stator assembly disposed around said rotor and being inductively coupled to said rotor;

said stator assembly having a plurality of poles;

each of said stator poles having a main winding and at least one fractional-power winding, said at least one fractional-power winding having a magnetic field strength between $\frac{1}{8}$th and $\frac{1}{20}$th of said main winding;

said main winding and said associated at least one fractional-power winding on each of said stator poles being wound so that the magnetic flux generated in said associated fractional-power winding will be added to the magnetic flux generated by said main winding to produce an increased magnetic field strength;

power switching means for independently energizing said main and said fractional-power windings on each of said stator poles; and means for selectively controlling the energization of said power switching means so that said main and said fractional-power windings on each of said stator poles can vary the rotational speed of said rotor and the amounts of torque supplied to the driven member.

* * * * *